May 21, 1929.  I. H. GLEICH  1,713,695
BUTTON BLANK CUTTING MACHINE
Filed July 21, 1922   5 Sheets-Sheet 1

WITNESS  INVENTOR

Fig. 4

May 21, 1929.  I. H. GLEICH  1,713,695
BUTTON BLANK CUTTING MACHINE
Filed July 21, 1922  5 Sheets-Sheet 5

WITNESS
INVENTOR

Patented May 21, 1929.

1,713,695

UNITED STATES PATENT OFFICE.

ISAAC H. GLEICH, OF NEW YORK, N. Y.

BUTTON-BLANK-CUTTING MACHINE.

Application filed July 21, 1922. Serial No. 576,533.

This invention is an improvement in button making and especially relates to the manufacture of pearl buttons from deep sea shells. The general objects of the invention are to lessen the cost of production of button blanks and to expedite the making of the blanks by increasing the utility of the shells and by automatically cutting a number of blanks simultaneously in a most economical manner, instead of cutting them singly by successive operation as is necessary by the present known method of, and machines for cutting such shells.

The more specific objects of the invention are:—(1) to provide a twin blank cutter head of the character hereinafter referred to, with a shell support that is simple and rigid in construction and efficient in operation; (2) to provide means for supporting irregular shell contours at a number of points simultaneously and evenly; (3) to provide means for accurately gauging the shell; (4) to provide means to alleviate the hard manual labor which ocean pearl blank cutting at present involves.

With these and other objects in view, which will be more apparent as the specification proceeds, the invention resides in certain novel construction and combination and arrangements of parts, the essential features of which are hereinafter fully described, are particularly pointed out in the appended claims, and are illustrated in the accompanying drawings, in which:

The invention may be classed under five general subdivisions, viz:—

Figure 1:
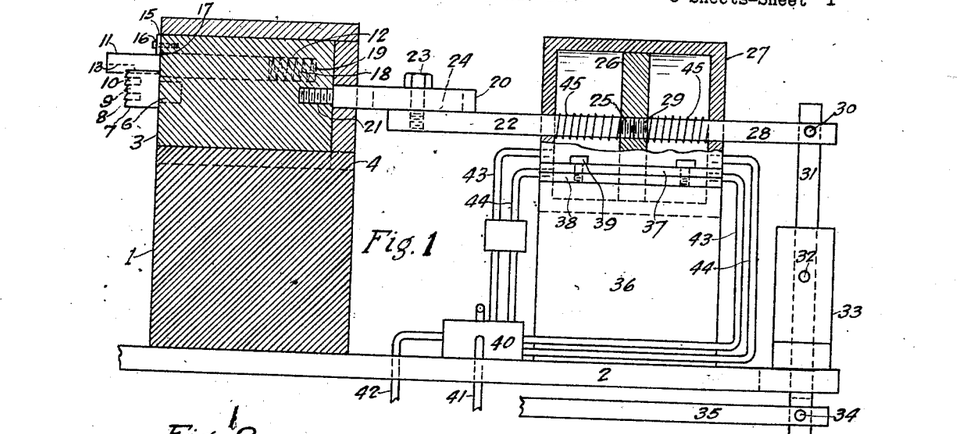
Figure 1, is a vertical sectional view of a support and a backer for a two cutter machine.
Figures 2, 10, 11:
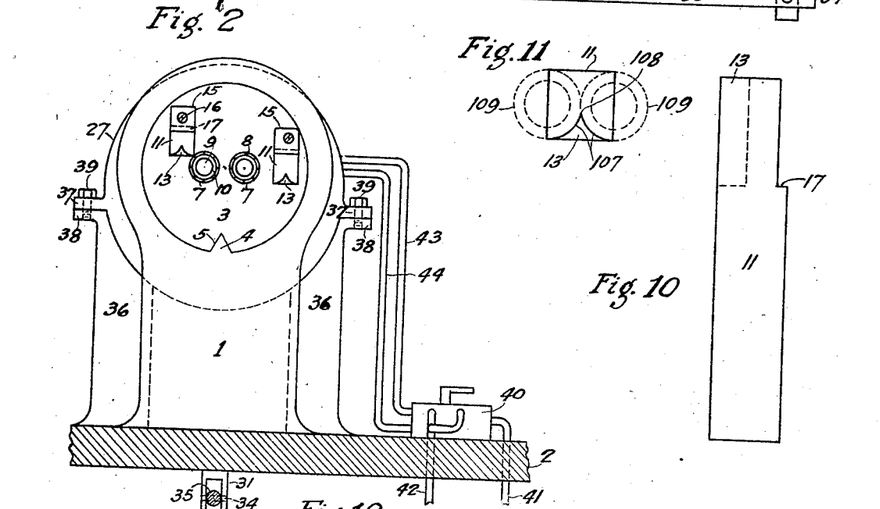
Figure 2, is a front view of same.
Figure 10, is a side view of a gage.
Figure 11, is a front view of same, in a somewhat diagrammatic form, the solid lines representing the form of the gage, the broken lines those of the cutters.

1. The support and tail stock for a machine with two cutters as illustrated in Figures 1 and 2.

2. The tail stock or support for a machine having three or more cutters, and operated by a fluid as illustrated in Figures 3 to 7.

Figures 5, 6, 7, 8, 9, 17, 18:
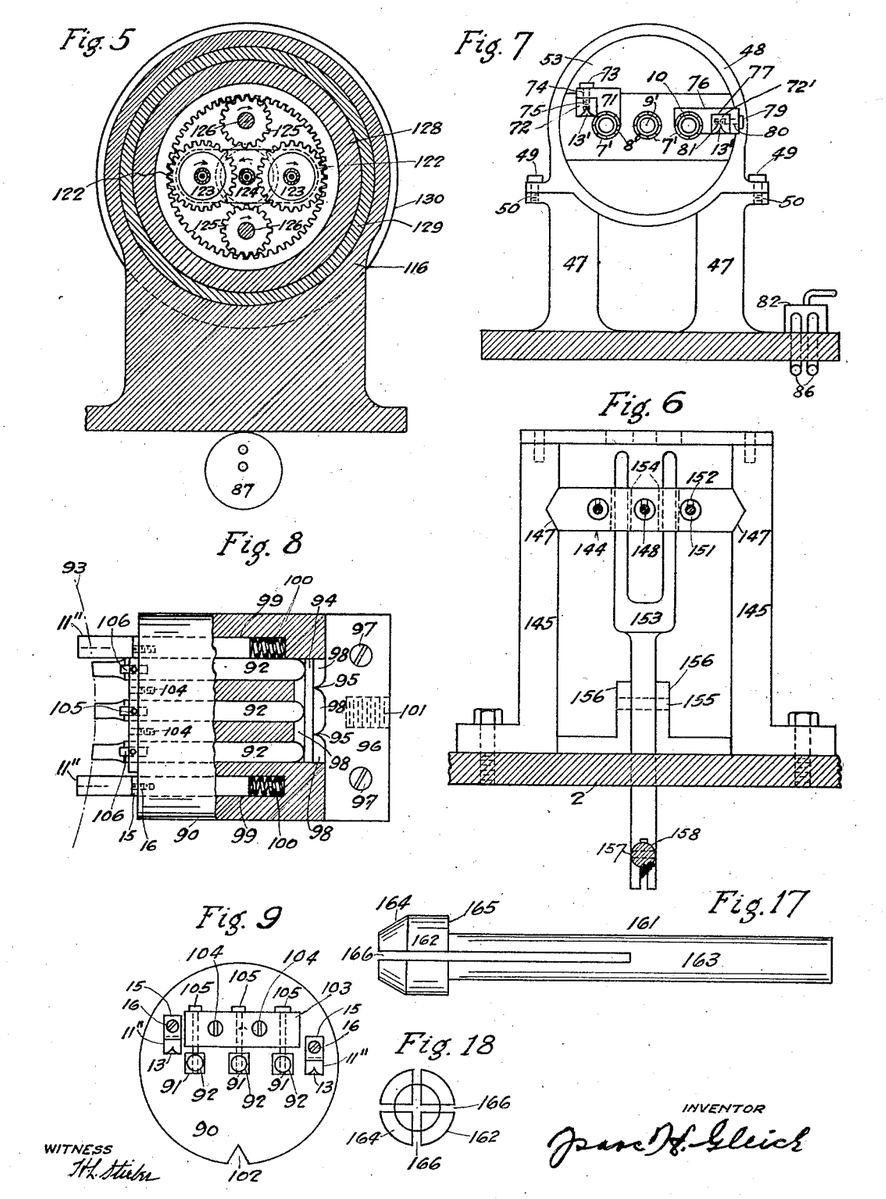
Figure 5, is a transverse sectional view in line 5—5 of Figures 3 and 4.
Figure 6, is a transverse sectional view in line 6—6 of Figures 3 and 4.
Figure 7, is a transverse sectional view in line 7—7 of Figures 3 and 4, showing construction of a tail stock where supporting pins are adjusted with a fluid pressure.
Figure 8, is a plan view partly in section of a shell support where pins are adjusted with a spring.
Figure 9, is a front view of same.
Figure 17, is a cutter remover.
Figure 18, is a front view of same.

3. The support for a machine having three or more cutters and operated by a spring as illustrated in Figures 8 and 9.

4. The gaging and steadying means.

5. The head stock and these various subdivisions will now be taken up in the order named.

*The support and tailstock for two cutters.*

Due to the extent to which the shell forms vary they do not afford a general utiliziation of them with a machine of a large number of cutters. The number of good blanks that may be cut simultaneously depends upon the degree of flatness of a shell. The shells therefore should be first assorted accordingly and so used.

Referring to Figures 1 and 2 of the drawing in the present application, 1 is a standard supporting the tail stock of a button-blank-cutting machine, and is preferably integral with bed 2, supporting the head stock. A cylindrical shank 3, slidably mounted in standard 1 is held from rotation by splines 4 formed in the standard and fitting into groove 5 in the shank, and has two pins 6 rigidly fastened in it. Pins 6 may be of any suitable design so as to engage and support the stock and may comprise a cylindrical body 7, formed at its end face with a circular row of teeth 8, a central stud 9, and separated from the teeth by an annular recess 10.

Figure 3:
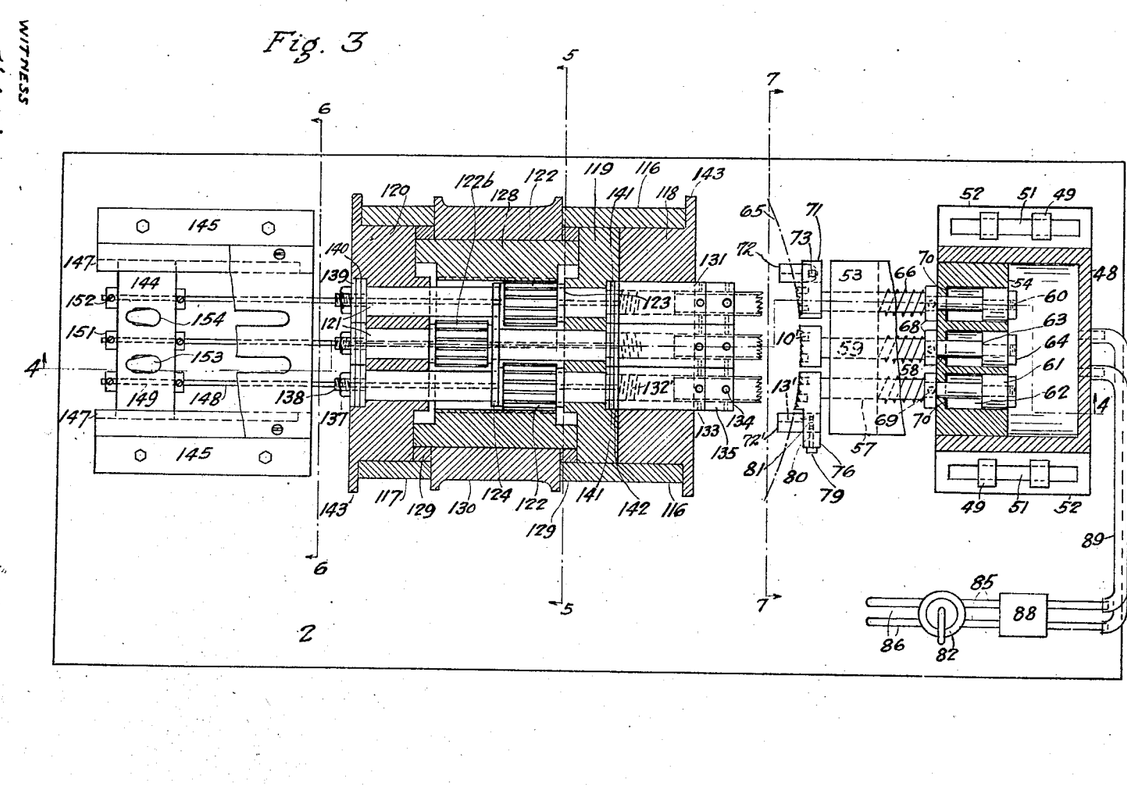
Figure 3, is a plan view, partly in section of another form of the complete machine.
Figure 12:
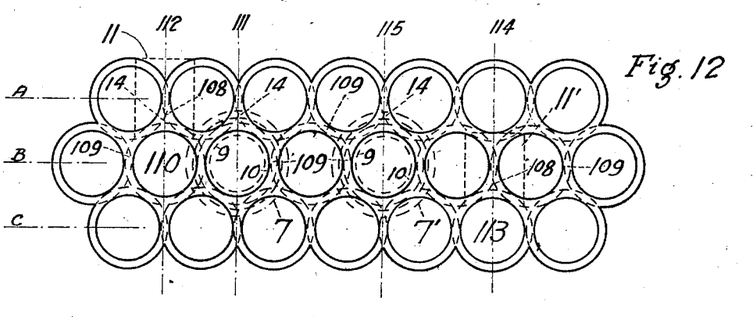
Figure 12, is a large detail view in a diagrammatic form, showing the relative position of the gages and supporting pins.

The pins 6 are placed in concentric relation with the cutters, as illustrated in Figure 3 so that their recesses 10 aline with the cutters and the latter can enter the recesses when they have completely cut the blanks from the stock. The pins are spaced apart so that the distance of the center of one pin to the center of the other pin is equal to the diameter of two blanks plus the thickness of two cuts made by a cutter, as illustrated in Figure 12.

The construction and the arrangement of the pins 6 will afford support for the shell at each one of the two points cut at each cutting operation and will prevent the breaking of the shell before the completion of the cut. The end face of the pins may form an arc having a curvature equal to the curvature of the average shell being cut so as to better seat the shell.

Figure 20:
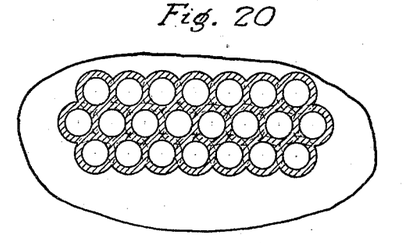
Figure 20, is a diagrammatic view of a portion of the shell showing the manner in which the spaces traversed by the cutters overlap.

In Figure 20 is shown in a somewhat diagrammatic form the manner in which the machine operates upon the shell so as to effect the greatest economy, there being only the thickness of one cut wasted between any two adjacent blanks. In said Figure 20 the shaded portion represents the amount cut away by the cutters.

Square shanked pins 11 are slidably mounted in suitable bearings 12 formed in the shank 3 adjacent each support and made to project beyond the serrated edges of the supports. The underside of the projections are provided with grooves 13 suitably shaped to engage a shell at points 14 (Fig. 15) formed thereon by two adjacent recesses made by a cutter and serve to gage and steady the stock during the cutting process.

The gage is slidably held between a spring 18, lightly tensioned between bottom of bearing 12 and inner end of the gage, and a feather 15 fastened to shank 3 by pins 16, and bearing on shoulder 17 formed in the gage.

The position of the gages with relation to the supporting pins will be taken up later as the specification continues.

Rod 20 has one end threaded into aperture 21 in shank 3, and the other end fastened to rod 22 by a bolt 23, carried thereby and adjustable in slit 24 of rod 20. This permits the lengthwise adjustment of supporting means with relation to the cutters independently of cylinder 27. Rod 22 is threaded into aperture 25 in piston 26, slidably fitting in cylinder 27.

Rod 28 has one end 29 threaded into piston 26 and the other end fulcrumed at 30 to a lever 31 pivoted at 32 in standards 33, supported on the bed of the machine and pivoted at 34 to rod 35.

Figure 4:
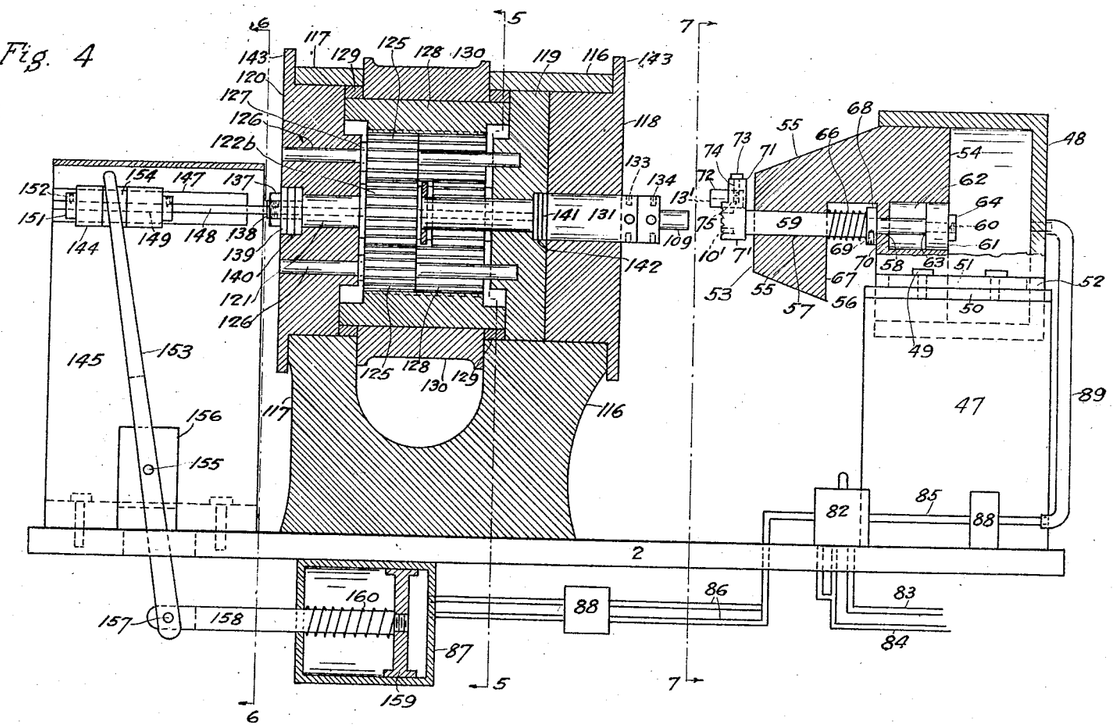
Figure 4, is a vertical sectional view on line 4—4 of Figure 3.

Being that the ejecting mechanism in a two cutter is similar to the one shown in Figure 4, rod 35 may be connected as at 157 to lever 153 to operate said mechanism. The cylinder 27 is mounted on the standards 36 supported on the bed 2 with its flanges 37, fastened down to flanges 38 of the standards by bolts 39.

A hand-operated valve 40 mounted on the bed 2 is connected with the main inlet 41, and exhaust 42, and with the inlet 43 and exhaust 44 on each end of the cylinder controlling the pressure to and from both chambers. The construction of the valve is such that when an inlet and an exhaust of opposite chambers in the cylinder coincide with the main inlet and exhaust, the exhaust and inlet of the same chambers are closed.

It will be seen that by introducing pressure into the outer end of the cylinder the piston will move the support and shell for the cutting operation, and by exhausting said pressure and introducing pressure at the other end of the cylinder the piston and connections may be made to operate ejectors as illustrated in Figures 3 and 4.

Springs 45 carried on rods 22 and 28 respectively within the cylinder and tensioned between piston and cylinder walls cushion the shocks of the piston. As the operation of feeding the shell to the cutters is slower than the operation of the ejectors against the blanks, the lever 31 should be pivoted where it will make up this difference in speed. Or speed boxes (detail not shown) may be mounted on the tubing for the inlet and outlet on both sides of the cylinder, so that the movement of the piston may be regulated independently of the hand-operated valve.

*The tail stock and pins operated by a fluid.*

In Figures 3 to 7 is shown another form of the machine. Supported on standards 47 preferably integral with bed 2 is a fluid pressure cylinder 48 capable of longitudinal adjustment on the standards by bolts 49 threaded into flanges 50 of the standards and loosely fitting in slits 51 through flanges 52 made integral with the cylinder 48.

Member 53 which is preferably of a single cast, has a cylindrical head 54 which is rigidly fastened into cylinder 48 and same is made air-tight. The front end 55 of the member is preferably tapered and wedge like, and its underside cut out as shown at 56. Slidably mounted in square bearings 57 and round bearings 58 in the member 53 are suitable pins 59, one end of which extends outward and beyond the face of tapered head 55 and may carry means for supporting a shell under a cutter such as described above. The other end 60 of each pin is threaded and has a piston 61 slidably fitting in a cylinder 62 formed in the member 53, rigidly fastened thereon between shoulder 63 and nut 64.

The end faces of the pins form an arc 65 equal to the curvature of the average shell being cut so that each pin will engage the maximum surface area of the piece of shell that is turned into a button blank. The supporting pins are placed in concentric relation with the cutters arranged and spaced as previously described with reference to Figs. 1 and 2. Thus their center distances are equal to the diameter of two blanks plus the thicknesses of two cuts made by a cutter. The angular construction of bearings 57 and those parts of the pins working therein will prevent same from rotating under the revolving cutters. Springs 66 abutting on one end against wall 67 of member 53 and the other end against a collar 68 rigidly held on the round portion of pins 59 by set screws 69 tend to keep pistons 61 and their pins inwards and cushion their forward movements.

The several pistons are preferably of equal diameters so that by admitting a fluid pressure into cylinder 48 the pistons 61 will receive equal pressure, and will push pins with an equal force in backing up the individual blanks under the cutters during the cutting process. The shell, due to its uneven surface and structure, when placed on a support having three or more pins arranged as shown, will rock on some of the pins and not come in proper seating contact with others. This will be overcome as soon as pressure of the cutters is brought to bear on the shell and on the pin or pins it rocks on, because the inward pressure of these pins with the constant pressure present in the cylinder will cause that equilibrium among all the pins where they will properly adjust themselves to the contour of the shell, and with the further introduction of pressure into the cylinder they will present a substantially good support to all the blanks until the completion of the cut. At this time the cutters will have slightly entered the recesses 10 in the supporting pins and the pistons 61 will have reached wall 70 in member 53 which will prevent their further outward movement. The space between the shell and a pin, that comes in supporting contact with the shell only after the shell has been pressed to it, is small, so that the further inward movement of the pins and pistons that come first in contact with the shell into their cylinders may be negligible as they hardly affect the general behavior of the pistons from distributing an equal counter-pressure.

Preferably integral with a supporting pin 59 on one end of the device is an elevated projection 71 carrying a gage 72 removably mounted thereon by means of a threaded bolt 73 extending through aperture 74 of the projection and meshing with threads 75 in gage. Preferably integral with a supporting pin 59 on the other end of the device is a projection 76 horizontally disposed, having a square undercut 77 to receive a gage 72' which is removably mounted therein by means of a threaded bolt 79 extending through aperture 80 in the projection and meshing with threads 81 in the gage. The gages 72 and 72' are provided with grooves 13' like that shown in Figures 10 and 11, and are positioned with relation to their adjacent supporting pins as illustrated in Figure 12.

A hand operated valve 82 connected with the tubing 83 and 84 for the main inlet and exhaust of pressure is mounted on the bed of the machine and is also connected with the tubing 85 leading to cylinder 48 and the tubing 86 leading into cylinder 87, supported to the underside of bed 2, and working the ejector mechanism, and controls the inlet and exhaust of the two cylinders. Pressure regulators 88 which may be of a known form are mounted on tubings 85 and tubings 86 to regulate the inlet and exhaust of the cylinder working the supporting pins and of the cylinder working the ejecting means independently of the valve for the reason described. Flexible tubings 89 may be used to connect the cylinder 48 with steel tubings 85 and will permit the longitudinal adjustment of said cylinder with relation to the cutting head in the original tube connections.

*Pins actuated by a spring.*

In Figures 8 and 9 is shown a device for supporting and gaging a shell under three cutters. This device works on the same principle as the device shown in Figure 7, in so far as the pins are being interrelated for adjustment, the adjustment of the pins to the shell however is performed with a spring.

A cylindrical body 90 has three bearings 91 square in cross-section and in each of which is slidably mounted a pin 92, the outer ends of which may be provided with shell seating heads of a known construction. The end faces of the pins 92 may form an arc 93 of a curvature corresponding to the curvature of the average shell. Each pin is placed in concentric relation with a cutter as illustrated in Figure 3. The inner ends of pins 92 abut against spring plate 94 held at two points by projections 95 carved out of plate 96; same is fastened to the body of the cylinder by screws 97. Clearings 98 allow spring plate free movement. Gaging pins 11'' are slidably mounted in suitable bearings 99 formed in the body and may be held forward by springs 100. It will be seen that the operation of these gages in their bearings is similar to those shown in Figures 1 and 2 and their construction and relative position with their adjacent pins are like that shown in Figures 10, 11 and 12. The cylinder or head 90 is suitably formed to be slidably mounted in standard 1 and is adapted to be rigidly fastened to threaded portion on rod 20 by threaded aperture 101 or by any other suitable means. Groove 102 in head 90 fits on splines 4 formed in standard 1 and prevents same from rotation.

The projections 95 come in contact with spring plate 94 and respectively support same between two adjacent supporting pins at points where the leverage of the center pin will be substantially equal to those on the end and where the inward pressure applied on both ends of spring plate 94 will cause an equal outward pressure by the center part of the spring plate.

A plate 103 fastened to the face of the body by screws 104 carries pins 105 extending into elongated slits 106 of supporting pins, permitting the supports free play but preventing them from unduly extending from their bearings.

A device such as this, or the ones shown in Figures 3 and 4 and described above, may be used wherever it is desired to have a number of points supported simultaneously under a uniform pressure.

The gaging and steadying means.

Figure 12 shows a diagrammatic view and illustrates the relative position of the gages with their respective supporting pins and cutters. A B C in said figure represent each a line of blanks as they are cut from the shell.

Figure 14:
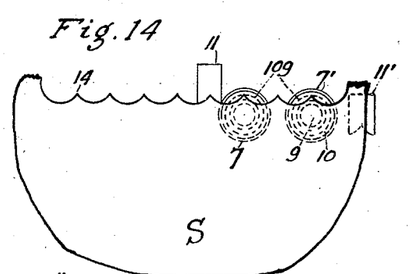
Figure 14, shows gage in use when once a line of blanks has been cut from a shell.

The gage 11 as illustrated has a groove 13 in the form of two equal arcs 107, having a common root 108. The radius of each arc as shown in Figure 11 is equal to the radius of the outside of a cutter 109, with which it is used and tends to gage and steady the shell at points 14 formed thereon by two adjacent cuts. The gage 11 is located near one end of the supports with its grooved face adjacent blank 110 that is in line B, so that the point of root 108 and the center of blank 110 are in the same vertical line that is numbered 112. The distance from the vertical central line across this gage to the vertical central line 111 across its adjacent support 7 is equal to the distance of two adjacent points 14 in the shell, namely one blank plus the thickness of one wall of the cutter. The distance between the centers of the adjacent supports 7 and 7 are equal to the diameters of two blanks plus two walls of a cutter. It will be apparent from the above description and the accompanying drawing that whenever any point 14 in the shell is placed into groove of gage 11, other points in the shell will be on the vertical central line of the respective supports and cutters so that they will cut blanks that are between two adjacent recesses made by preceding cuts and permit cutters to work outside shell so that they will only round off the recesses on each side of points 14 in forming that part of the blank. However, a gage positioned with relation to the cutters as described will gage a shell only after a line of blanks have been cut from same and a line of points formed thereon as shown in Figure 14.

Figure 13:
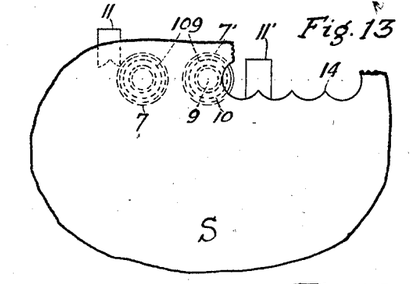
Figure 13, shows gage in use on the first line of blanks cut in a new shell.
Figure 16:
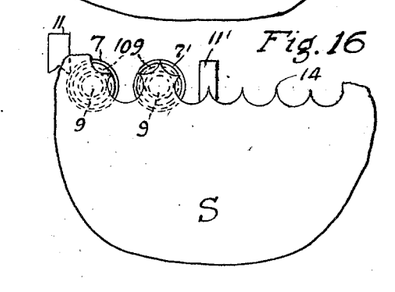
Figure 16, shows gage in use on last blanks in a line.

To gage part of the first line of blanks in a new shell, as shown in Figure 13, or to gage the last blanks in each following line as shown in Figure 16, a gage 11' designed like the one described is placed on the other end of the series of supporting pins with its grooved faced 13 adjacent and across the vertical central line of blank 113 that is in line C. The distance between the vertical central line 114 across gage 11' and the vertical central line 115 across its adjacent cutter and support is equal to the distance of one and a half recesses made by a cutter in the shell, namely, the diameter of one and a half blanks plus one and a half times the thickness of one wall of a cutter.

Figure 15:
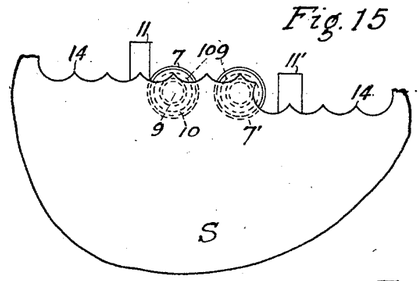
Figure 15, shows when both gages are in action.

The direction in which the gages gage depends entirely on their position, namely, whether the upper or lower gage is nearest the operator. In case the latter is nearest, as shown in the drawings, the operator starts cutting at that end of the shell that is nearest to himself. If the former is nearest, the operation is reversed. Having made the first two cutting operations forming points 14 on shell, it is ready to be gaged by lower gage 11' that is in line with supporting pins until the completion of the line as shown in Figure 13. Once a full line of blanks is cut, the shell is gaged by the upper gage 11, as shown in Figure 14. After having made two cutting operations with the assistance of gage 11 forming a lower line of points in the shell, both gages may be used as shown in Figure 15. To complete the last blanks in each line the lower gage 11' is used as shown in Figure 16. It will be obvious that either one or both gages may be used with a single cutter in which case the the upper gage 11 would preferably be made rigid with the supporting pin. A considerable percentage of the shells are white bodied and yellow tipped. It is the practice to cut these two parts of the shell separate so as to save the labor of resorting the two grades of blanks. When the white portion is cut first the gages may be removed or pressed into their bearings by the overlapping portion of the shell. The springs 18 as in Figure 1, or 100 in Figures 8 and 9, will always return the gages into operative position.

The head stock.

Integral with bed 2 supporting the tail stock are two standards numbered 116 and 117 respectively which have openings that are preferably of the same internal diameter.

Mounted in the standard 116 are bearings 118 and 119 and in standard 117 is a bearing 120 in which are rotatably mounted a series of parallel spindles 121 each of which carries a gear thereon and numbered respectively 122 and 122$^b$.

These gears, as shown in Figures 3, are placed preferably in staggered relation to each other, permitting the use of larger spindles and gearing.

Washers 123 are loosely mounted on spindles 121. Plate 124 is also loosely mounted on spindles 121 and keeps gears from longitudinal movement.

Gears 125 preferably integral with spindles 126 are rotatably mounted in bearings 119 and 120, preferably at right angles with the plane of the cutter spindles and made to mesh with gear 122$^b$. Washers 127 are loosely mounted on spindles 126.

Internal gear 128 rotatably mounted between standards 116 and 117 in bushings 129 meshes with gears 122 and gears 125 and carries a pulley 130, belted to any suitable source of power. Chucks 131 are mounted in bearing 118 and carry threads 132 to mesh with threads on spindles 121. The front end of each chuck is reduced and provided with threads 131' to mesh with the threads 135' in chuck sleeve 135. A shell 136 is tapered as at 136' to mesh with taper 136'' in the chuck head. The shell 136 should be slotted along one side, so that it may be compressed and brought into gripping contact with taper 136'' and cutter 109 when sleeve is tightened on the threads on the chuck. Apertures 133, or any other suitable means may be formed on chuck to afford a sure gripping surface whereby it may be held and tightened on spindle. The adjacent chucks run in opposite directions and are made full size between centers so that any pair of chucks are in rolling contact with each other through their entire length, permitting the use of larger and stronger chucks. The adjacent cutters may be spaced apart precisely the distance equal to the internal diameter of a cutter. However, to permit a freer adjustment of the shell, the machine is preferably made a slight degree oversize.

Apertures 134 in chuck shell 135 or any other suitable means, may be formed thereon whereby said shell may be held and tightened on chuck to fasten cutter therein.

Nuts 137 threaded on spindles 121 at 138 and bearing against thrust collars 139 in apertures 140 in bearing 120, and chucks 131 mounted in bearing 118, threaded on the spindles 121 at 132' and bearing against thrust collars 141 mounted in apertures 142 formed in bearing 119, prevent spindles from endwise movement. The threads 135' in the shell 135 run in the same direction as the threads 132 in the chuck. The threads 132' and 138 on each spindle run in an opposite direction. The same threads on the adjacent spindles run opposite each other.

It will be seen that when the spindles are rotated in an opposite direction to each other and to these threads, the nuts 137, chucks 131, and shell 135 will not be loosened thereon.

Bearings 118 and 120 have flanged ends 143 whereby they may be readily removed from the standards.

A plate 144 is slidably mounted between standards 145 supported on bed 2 and is suitably formed to fit into grooves 147 in said standards.

Ejector rods 148 loosely mounted in apertures 149 in said plate have enlarged heads 150 so as not to puncture the blanks while ejecting same, and are held in the apertures 149 by collars 151 carrying set screw 152 to be fastened on the rods 148, and prevent same from endwise movement in apertures 149.

A forked lever 153, loosely fitting in apertures 154 formed in the plate 144 between passages for adjacent rods, is pivoted at 155 in uprights 156, made integral with standards 145, and fulcrumed at 157 to piston rod 158 actuated by piston 159 from pressure in cylinder 87, and works the ejector mechanism.

A spring 160 coiled on rod 158 between piston and cylinder wall tends to return the ejectors after the exhaust of pressure from cylinder 87.

*The cutter remover.*

To facilitate the removal of the cutter from the chuck I provide a pin 161 with a head 162 of a diameter equal to the outside diameter of a cutter and a shank 163, preferably smaller in diameter than the inside of a cutter. Head 162 has its outer end tapered as shown at 164 and its inner end cut at right angles with it forming a shoulder 165. The head 162 of pin is slotted endwise and crosswise as at 166, said slots extending considerably into the shank so that the head may be easily compressed, and reduced to the inside diameter of the cutter.

Figure 19:
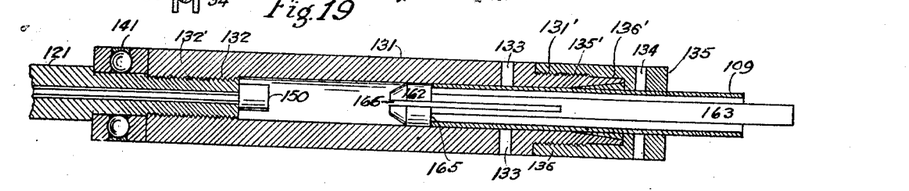
Figure 19 is an enlarged detail view of the chuck with the cutter remover in working position.

In operation: After chuck shell 135 is removed, pin 161 is placed with its tapered head into cutter and forced through it. When the head expands the shoulder 165 is brought to bear against the inner end of the cutter, as shown in Figure 19, and a slight blow of the ejector rod on the head of pin 161 will remove the cutter.

The operation of a machine where pins are adjusted by means of fluid pressure is as follows: The shell is placed on the supporting pins, the valve is opened permitting pressure to enter cylinder 48 moving the pins and the shell for the cutting operation. Turning the valve back will exhaust said pressure permitting the spring 66 to return the pins to their normal position and introduce pressure into cylinder 87 working the ejectors. The shell is again deposited on the supporting pins, the valve is pulled forward, opening the exhaust in cylinder 87, permitting the spring 160 to return the ejectors to their normal position and opening the inlet in cylinder 48, moving the pins and shell under the cutters as before for performing the cutting operation. It will be understood that the number of sets of tools shown in Figures 3 and 4 is illustrative and that a greater or lesser number of sets may be employed. The operation of the machine upon the shell would remain relatively the same.

In practice the shell is placed on the support with the flaky side and it is therefore suggested to gradually reduce the pressure on pins when cutters have reached this part of the shell and before they have completely cut through the shell, because the supports are tensioned while the pearl or harder part of the shell is being cut, and this tension with a gradually reduced pressure is sufficient to cut clean through this soft part of the shell.

It will be obvious that the supports shown in Figures 1 and 8 may be mounted on a tail stock operated by a hand lever. However, the strain on the operator would be great considering that several thousand cuts are made daily. With the device shown these cuts and so many ejections of blanks can be performed by fluid pressure involving merely a light turn of a valve handle one way or another. The additional cost of maintenance will be negligible in comparison with the larger production of better blanks.

Having thus described the preferred form of my invention, what I claim as new and desire to secure by Letters Patent is,—

1. In a machine for operating upon the stock from which button blanks are cut, the combination of a plurality of cutting tools, slidably mounted stock supporting tools, each supporting the stock opposite a cutter, and an equalizing fluid pressure for causing the supporting tools to support the stock simultaneously and evenly.

2. In a button blank cutting machine, the combination of a series of supporting pins slidably mounted in bearings and a live fluid pressure for actuating the movement of the pins, the pins in the series co-operating for evenly distributing the pressure at the supporting points, and manipulative means for controlling the fluid pressure to and from the pins.

3. In a button blank cutting machine, the combination of a plurality of cylinders, a piston mounted for movement in each cylinder, a support operably connected with each piston, a cutter opposite each support and a valve controlling a fluid under even pressure for simultaneously actuating the movement of the several pistons and supports.

4. A device for supporting, gaging and steadying the stock from which button blanks are cut, said device comprising a body having one end formed to fasten to a tail stock, and the opposite end being formed to engage the button blank stock, and a member extending from said body beyond the stock engaging portion and provided with a groove to engage the stock, to gage the same and also hold it from rotation.

5. A machine for operating upon the stock from which button blanks are cut, the combination of blank cutting tools co-operating with stock supporting tools and a member for gaging the stock positioned with relation to the cooperating tools by engaging the stock at a point between two previous cuts so as to position the stock under the tools in such relation as to cause the tools to cut blanks from the stock, one blank between two adjacent recesses made by preceding cuts in the stock and another at a point in advance of the recesses of the preceding cuts.

6. In a button blank cutting machine, the combination of a series of tubular cutting tools and a series of slidably mounted stock supporting tools, ejectors to clear the blanks from the cutters, the supports and ejectors being adapted to be actuated for movement by fluid pressure, and means for conveying the fluid pressure connected respectively with said ejectors and supports.

7. In a blank cutting machine, the combination of a plurality of spindles, a cutter for each spindle, the free ends of the spindles being threaded in a direction opposite to each other and the threads of one spindle running opposite to the threads of an adjacent spindle, bearings for the spindles, a member with corresponding threads for each spindle to secure the cutter thereto, a member with corresponding threads at the other end of each spindle cooperating with the cutter securing member and shoulders on said bearings to keep said spindles axially at rest in their bearings, and means for rotating the adjacent spindles together and in a direction opposite to each other and opposite to their running threads.

ISAAC H. GLEICH.